United States Patent [19]

Kobayashi

[11] Patent Number: 5,210,724
[45] Date of Patent: May 11, 1993

[54] OPTOMAGNETIC RECORDING METHOD AND APPARATUS WHICH PRECLUDES AN INTERFACE MAGNETIC WALL WITHIN BLOCK MAGNETIC WALL

[75] Inventor: Tadashi Kobayashi, Yokohama, Japan

[73] Assignee: Canon Kabushiki Kaisha, Tokyo, Japan

[21] Appl. No.: 804,508

[22] Filed: Dec. 10, 1991

Related U.S. Application Data

[63] Continuation of Ser. No. 320,090, Mar. 7, 1989, abandoned.

[30] Foreign Application Priority Data

Mar. 7, 1988 [JP] Japan .................. 63-51537

[51] Int. Cl.$^5$ .............. G11B 13/04; G11B 11/12; G11B 11/10
[52] U.S. Cl. ............................. 369/13; 360/59; 360/114; 365/122
[58] Field of Search ............ 369/13; 360/59, 114; 365/10, 22, 32, 27, 122

[56] References Cited

U.S. PATENT DOCUMENTS

| | | | | |
|---|---|---|---|---|
| 3,521,294 | 7/1970 | Treves | ..................... | 360/59 |
| 3,996,571 | 12/1976 | Chang | ..................... | 365/32 |
| 4,151,602 | 4/1979 | Haisma et al. | ..................... | 365/32 |
| 4,198,692 | 4/1980 | Kobayashi | ..................... | 365/27 |
| 4,612,587 | 9/1986 | Kaneko et al. | ..................... | 365/10 |
| 4,771,347 | 9/1988 | Horimai et al. | ..................... | 369/13 |
| 4,855,975 | 8/1989 | Akasaka et al. | ..................... | 369/13 |

FOREIGN PATENT DOCUMENTS

| | | |
|---|---|---|
| 3619618 | 6/1986 | Fed. Rep. of Germany . |
| 62-175948 | 8/1987 | Japan . |
| 63-133338 | 6/1988 | Japan . |
| 63-153752 | 6/1988 | Japan . |

*Primary Examiner*—Hoa T. Nguyen
*Attorney, Agent, or Firm*—Fitzpatrick, Cella, Harper & Scinto

[57] ABSTRACT

An information recording method, which performs recording of an information by use of an optical magnetic recording medium provided with a first magnetic layer and a second magnetic layer having higher Curie point and lower coercive force at room temperature than the first magnetic layer, by carrying out initialization to align the magnetization direction of the second magnetic layer in one direction and then irradiating an optical beam of which power has received modulation between the two values which are not zero depending on the information, thereby recording the information as the arrangement of a magnetic domain on the above medium, has characteristic such that, when initialized again after recording of the above information, an interface magnetic wall is permitted to exist between said first and second magnetic layers at the portion other than said magnetic domain.

10 Claims, 5 Drawing Sheets

OPTOMAGNETIC RECORDING METHOD AND APPARATUS WHICH PRECLUDES AN INTERFACE MAGNETIC WALL WITHIN BLOCK MAGNETIC WALL

This application is a continuation of application Ser. No. 320,090, filed Mar. 7, 1989, now abandoned.

BACKGROUND OF THE INVENTION

1. Field of the Invention

This invention relates to a method of recording information. In particular, the present invention relates to recording digital signals of two values on an optical magnetic recording medium provided with a first magnetic layer and a second magnetic layer, wherein the second magnetic layer has a higher Curie point and lower coercive force at room temperature than the first magnetic layer.

2. Related Background Art

Research and development of an optical memory element which uses a laser beam has quickly realized optical media with high density and large memory capacity. However, it is optical magnetic recording medium which is advisable for use as a rewritable optical memory element.

When information recorded on an optical magnetic recording medium is to be rewritten, the information must be erased before the new information is recorded since overwriting cannot be attained. For example, when information on a predetermined track of an optical magnetic disc is to be rewritten, the information on the track is erased in one revolution of the disk and then new information is written in the following revolution. As a result, re-recording speeds are low.

In order to solve the above problem, prior art apparatus provide separate record/reproduce head and erase heads. Information can also be recorded by an application of a magnetic field while a laser beam is modulated. However, such an apparatus is costly, quite large and often cannot attain high speed modulation.

On the other hand, an overwritable optical magnetic recording medium without the above drawbacks which enables overwriting similarly as magnetic recording media using a recording device constructed according to the prior art with a magnetic field generating means and a recording method by use thereof, is proposed in Japanese Laid-Open Patent Application No. 62-175948 (corresponding to West Germany Offenlegungsschrift 3,619,618) and commonly-assigned Japanese Laid-Open Patent Application Nos. 63-153752 and 63-133338 (both corresponding to U.S. patent application Ser. No. 475,941, filed Jan. 30, 1990). Such recording methods are illustrated at FIGS. 1A and 1B.

FIG. 1A shows the magnetized state of an optical magnetic recording medium and FIG. 1B shows the power of the laser beam irradiated on the medium, wherein reference numeral 1 denotes a first magnetic layer (recording layer) and reference numeral 2 denotes a second magnetic layer (initialization layer) having a higher Curie point and lower coercive force at room temperature than the first magnetic layer 1. As shown in FIG. 1B the laser beam with intensity modulated to "high" or "low" (corresponding to the recording signal "1" or "0", respectively) is irradiated to record information. When the medium after recording is initialized by the initialization magnetic field 6, it attains the magnetized state shown in FIG. 1A.

In FIG. 1A, for example, as the recording layer and the initialization layer, rare earth-iron group amorphous alloy thin films having the same compositions relative to the compensation composition are used. Reference numeral 4 denotes a Bloch magnetic wall formed on the side faces of the cylindrical magnetic domain 3 recorded on the recording layer 1, and reference numeral 5 denotes an interface magnetic wall formed at the boundary between the cylindrical magnetic domain 3 and the initialization layer 2. As used herein, the term "magnetic wall" refers to a transition region where the magnetic moment changes its direction gradually. The magnetic wall therefore accumulates energy of a certain magnitude and constantly tends to make its area smaller.

In the above example, since both the Bloch and interface magnetic walls tend to make their areas smaller (that is, the region of stable magnetization domain tends to be enlarged), both act to collapse the recording magnetization domain. The initialization magnetic field 6 also acts to make the area of the Bloch magnetic wall smaller. Therefore, the recording magnetic domain becomes unstable.

SUMMARY OF THE INVENTION

An object of the present invention is to provide an information recording method using an optical magnetic recording medium capable of overwriting which has solved the problems of the prior art as described above by storing recorded information more stably.

The above object of the present invention can be accomplished by recording information on an optical magnetic recording medium (provided with a first magnetic layer and a second magnetic layer which has a higher Curie point and a lower coercive force at room temperature than the first magnetic layer) by carrying out initialization (to align the magnetization direction of said second magnetic layer in one direction) and then irradiating the medium with an optical beam having power which is modulated between two non-zero values, thereby recording information as the arrangement of a magnetic domain characterized in that, when initialized again (e.g., after recording), an interface magnetic wall is permitted to exist between said first and second magnetic layers at the portion other than said magnetic domain.

DETAILED DESCRIPTION OF THE PREFERRED EMBODIMENT

Figure 2:
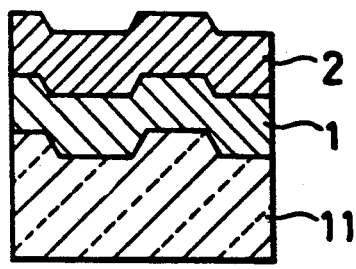
FIG. 2 is a schematic sectional view showing an embodiment of the optical magnetic medium to be used in the present invention.

FIG. 2 is a schematic sectional view showing the construction of an embodiment of the optical magnetic recording medium used in accordance with the present invention. The optical magnetic recording medium in FIG. 2 has a first (recording) magnetic layer 1 and a second (initialization) magnetic layer 2 laminated on a light-transmissive substrate 11 provided previously with a guide groove (pregroove). The recording layer 1 has a low Curie point ($T_L$) and a high coercive force ($H_H$), and the initialization magnetic layer 2 has a high Curie point ($T_H$) and a low coercive force ($H_L$) wherein "high" and "low" are relative relationships when both magnetic layers 1 and 2 are compared with each other (the comparison is at room temperature for coercive force). However, it is preferable ordinarily that the recording magnetic layer 1 substantially has $T_L$ in the range of of 70° to 180° C., $H_H$ of 3 to 10 K Öe, and the initialization magnetic layer substantially has $T_H$ of 100° to 400° C. and $H_L$ of 0.5 to 2 KÖe.

For the main component of magnetic layers 1 and 2, magnetic amorphous alloys of rare earth elements and transition metals showing vertical magnetic anisotropy and exhibiting magnetic optical effect can be utilized such as, for example, GdCo, GdFe, TbFe, DyFe, GdTbFe, TbDyFe, GdTbFeCo, TbFeCo, GdTbCo, etc.

The magnetic layers 1, 2 are exchange bonded to each other and in the present invention, the saturated magnetization Ms, the film thickness h and the magnetic wall energy $\sigma w$ between the two magnetic layers preferably has the relationship:

$$H_H > H_L > \sigma w / 2Msh$$

Figure 3:
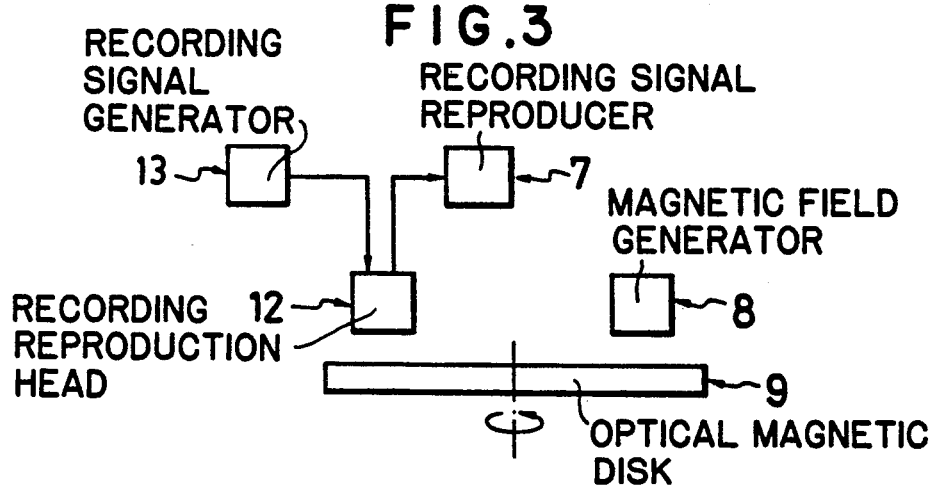
FIG. 3 is a conceptional view of the recording device for practicing the present invention.
Figure 4:
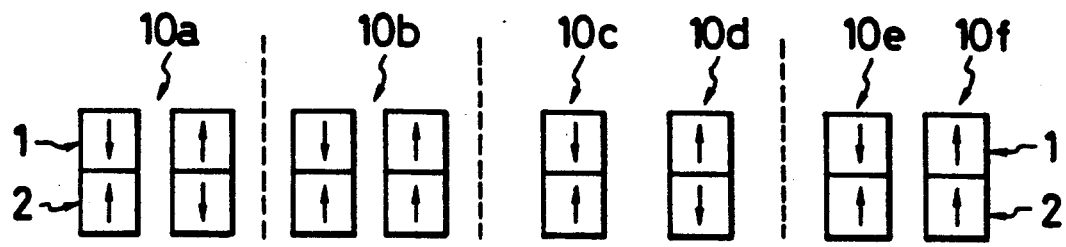
FIG. 4 is a schematic view showing the change in the magnetization direction according to the present invention.

As described below with reference to FIG. 3 and FIG. 4, is the recording method of the present invention using the above optical magnetic recording medium wherein FIG. 4 shows the direction of magnetization of both magnetic layers 1, 2 during recording, and FIG. 3 illustrates schematically the recording device. Before recording, the stable directions of magnetization of both magnetic layers 1 and 2 may be either parallel (in the same direction) or antiparallel (in the opposite directions). In FIG. 4 describes the case when the stable directions of magnetization are antiparallel.

In FIG. 3, reference numeral 9 denotes an optical magnetic disk 9 as described above referring to FIG. 2. For example, the initial magnetized state of a part of the magnetic layers 1 and 2 is shown at 10a of FIG. 4. The optical magnetic disk 9 is rotated by a spindle motor to pass through the magnetic field generating section 8. At this time, when the magnitude of the magnetic field of the magnetic field generating section 8 is a value between the coercive forces of both magnetic layers 1 and 2 (note that the direction of the magnetic field here is upward), the second magnetic layer 2 is magnetized in a uniform direction as shown in 10b, while the first magnetic layer 1 remains as initially magnetized.

Next, when the optical magnetic disk 9 rotates to pass through the recording-reproduction head 12, a laser beam having two laser power values is irradiated on the disk surface, following the digital signal of the two values from the recording signal generator 13. The first laser power can elevate the temperature of disk 9 only to near the Curie point of the first magnetic layer 1, and the second laser power is a power which can elevate the temperature of disk 9 near the Curie point of the second magnetic layer 2. That is, the first laser power can elevate the temperature of the disk to nearly $T_L$, and the second kind of laser power to nearly $T_H$.

The first or second laser power corresponds to either the digit "1" or "0" of the digital signal, respectively.

Using the first laser power, the first magnetic layer 1 can be elevated in temperature to near the Curie point. Since the second magnetic layer 2 has a coercive force at which a bit stably exists at this temperature, the magnetized state becomes that shown in 10c by setting adequately the bias magnetic field during recording.

As used herein, "setting adequately the bias magnetic field" means that, by recording with the first laser power, magnetization of the first layer 1 receives the exchange force to be arranged in stable direction (here, in the opposite direction) relative to the direction of magnetization of the second magnetic layer 2, and, therefore, no bias magnetic field is essentially required. However, the bias magnetic field is set in the direction supplementing the magnetic inversion of the second magnetic layer 2 (namely, the direction which disturbs recording with the first laser power) in recording using the second laser power, as described below. The bias magnetic field is preferred to be set for the purpose of convenience under the same states of magnitude and direction in recording with both the first and second laser powers.

From this standpoint, it is preferable to set the bias magnetic field at the minimum magnitude necessary for recording with the second laser power according to the principle as described below, taking into account the adequate setting mentioned above.

The second recording is described.

When disk 9 is elevated to a temperature near the Curie point of the second magnetic layer 2 with the second laser power, the direction of the magnetization of the second magnetic layer 2 is inverted by the bias magnetic field described above. Subsequently, the magnetization of the first magnetic layer 1 is also arranged in the direction stable to the second magnetic layer 2 (here, in the opposite direction). That is, the magnetized state becomes that shown in 10d.

Thus, by use of the bias magnetic field and the first and second laser powers (which vary depending on the signal), the respective site of the optical magnetic disk becomes either state 10c or 10d of FIG. 4.

Next, when the optical magnetic disk 9 is rotated to permit the recording section to pass again through the magnetic field generating section 8, since the magnitude of the magnetic field of the magnetic field generation section 8 is set between the coercive forces of the magnetic layers 1 and 2 as described above, the recording bit 10c remains under the state 10e without change. On the other hand, the recording bit 10d undergoes magnetization inversion of the second magnetic layer 2 to attain the state of 10f.

Thus, it is seen that referring to FIG. 4, wherein the stable directions of magnetization are antiparallel, when the recording medium in the state shown as 10a passes through an initializing magnetic field generator having an upward magnetic field direction (element 8 of FIG. 3), the state of the second layer changes from that of 10a into the state of 10b, while the first layer is maintained unchanged (since the magnetic field generator creates a magnetic field which is greater than the coercive force of the second layer but less than the coercive force of the first layer). A laser having two non-zero power levels is then applied to the recording medium. When the lower power value is irradiated on layers in the state 10b, the temperature of the first layer is elevated to near the Curie point, and its magnetization is lost (the second layer does not lose its magnetization because its Curie point is higher than that of the first layer). The layers are then cooled in order to align the magnetization in the first layer due to the exchange bonding force of the second layer. The layers now attain the alignment state of 10c.

In contrast, when the laser beam having the higher power value is applied to the recording layers of 10b, both the first and second layers lose their magnetization (since the laser beam raises the materials past the Curie temperature of both the recording layers). Thereafter, a downward bias magnetic field is applied as the layers are cooled. The second layer is magnetized before the first layer because the second layer has a higher Curie point than the first layer so that even in the absence of the bias magnetic field, the first layer attains a magnetization by the exchange-bonding force of the second layer when the layers are cooled further, as shown in 10d.

Moreover, state 10e can be attained simply by passing the recording media of state 10c through the magnetic field generator. Similarly, state 10f can also be attained by passing recording media of the state 10d through the magnetic field generator. Therefore, in view of the above, it is clear that the present invention can produce a new record state irrespective of the previous record state.

The information thus recorded can be reproduced by irradiating a laser beam for reproduction and processing the reproduced light with a recording signal reproducer 7.

Figure 5A:
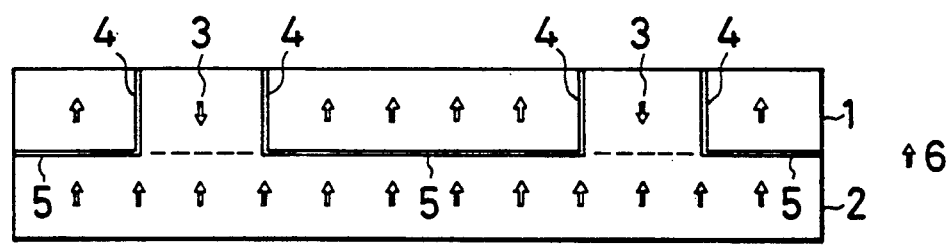
FIGS. 5A and 5B show the magnetization state of the medium and laser power in the present invention.
Figure 5B:
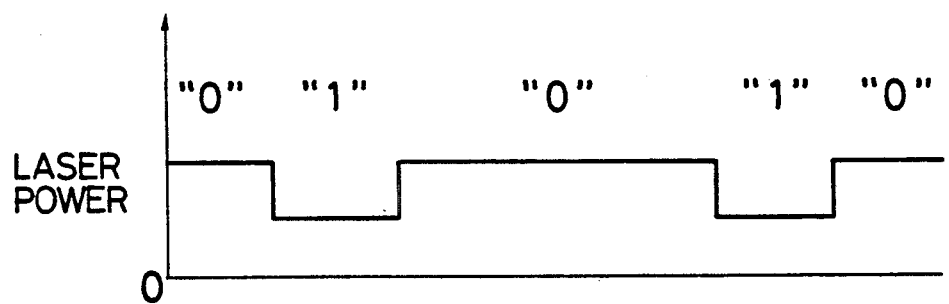
Figure 6:
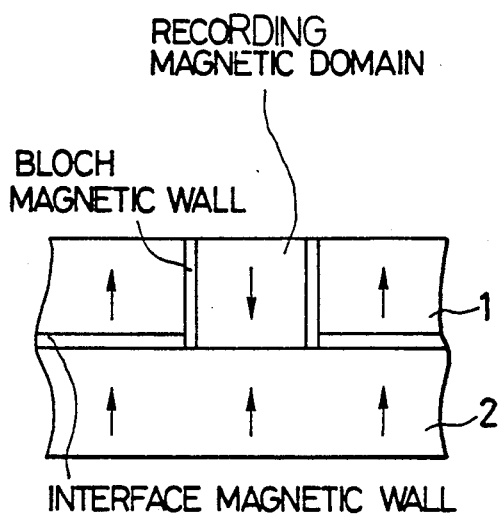
FIGS. 6 through 9 are respectively schematic views of the magnetization states after recording in Examples 1 and 2 and Comparative Examples 1 and 2.
Figure 7:
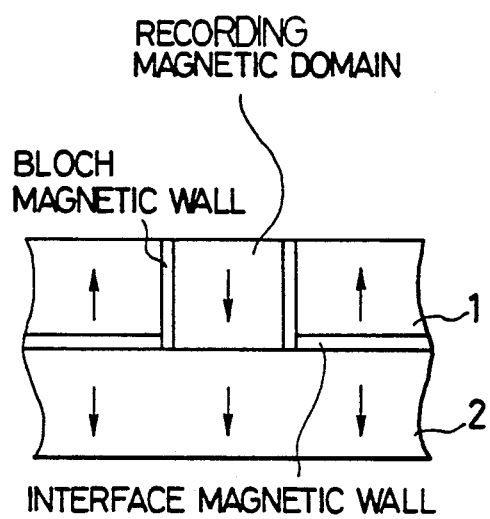
Figure 8:
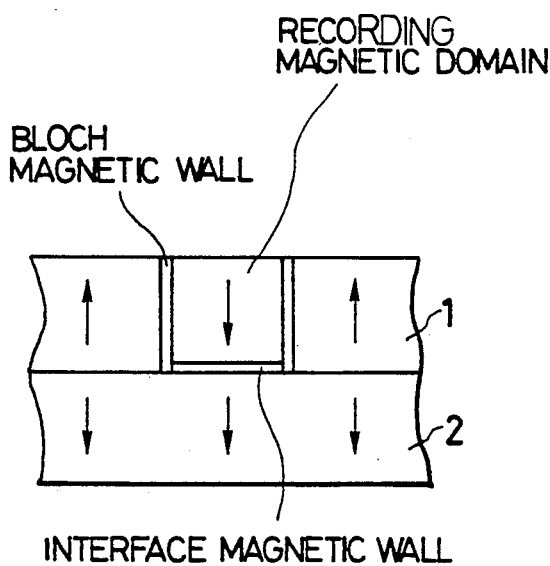
Figure 9:
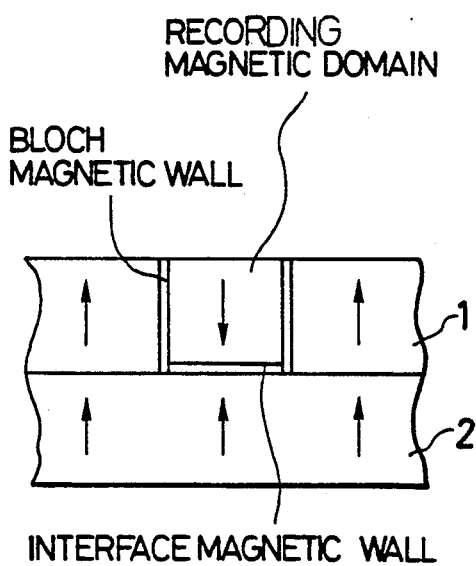

FIG. 5A shows the magnetized state of the medium initialized again after the recording as described above. FIG. 5B shows the laser power irradiated on the corresponding portion.

As is apparent from FIG. 5A, the interface magnetic wall 5 of the medium recorded by the method of the present invention exists externally of the recording magnetic domain 3. Also, in this case, the Bloch magnetic wall 4 and the interface magnetic wall 5 act to make their areas smaller, but while the Bloch magnetic wall acts to collapse the recording magnetic domain (to reduce the region of the stable magnetization domain), the interface magnetic wall acts to expand the recording magnetic domain (to expand the region of the stable magnetization domain). Accordingly, since the directions of action are opposite to each other in the Bloch magnetic wall and the interface magnetic wall, the actions are cancelled each other and thus improve the stability of the recording domain.

In this case, if the energy densities of the Bloch magnetic wall and the interface magnetic wall are equal, the ratio of the action of the Bloch magnetic wall to the action of the interface magnetic wall becomes equal to the ratio of the reciprocal of the diameter of the recording magnetic domain to the reciprocal of the film thickness of the recording layer. Since the diameter of the recording magnetic domain is larger than the film thickness, the actions of both do not actually cancel each other, but rather, the action of the expanding the magnetic domain by the interface magnetic wall remains.

Figure 1A:
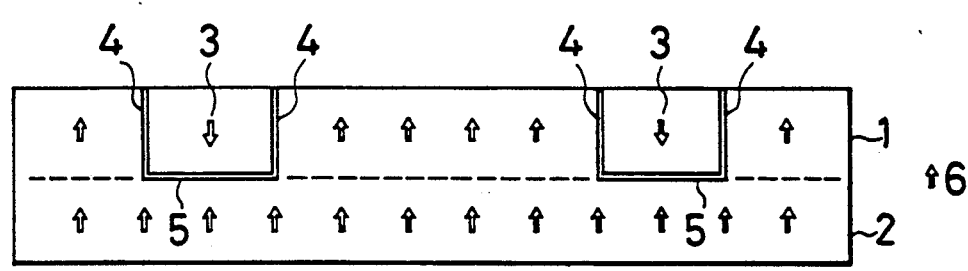
FIGS. 1A and 1B are schematic views showing the magnetized state of the recording medium and laser power used in the prior art.
Figure 1B:
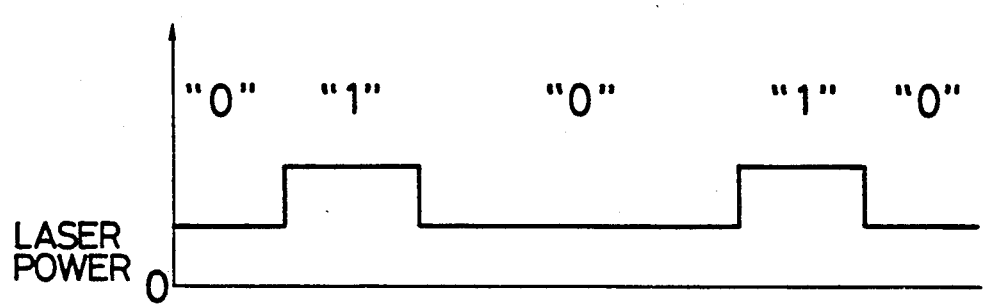

In the medium used in the present invention, even when a rare earth-iron group amorphous alloy thin film having the composition on the same side with respect to the compensation composition as the recording layer and the initialization layer, stability of the magnetic domain can be increased by making an interface magnetic wall outside of the recording magnetic domain. However, more preferably, a rare earth-iron group amorphous alloy thin film having the composition opposite to each other with respect to the compensation composition as the recording layer and the initialization layer should be used. This is because forming the recording layer and the initialization layer from rare earth-iron group amorphous alloy thin films having compositions opposite to each other with respect to the compensation composition will make the magnetization of the two layers parallel to each other and to the initialization magnetic field 6 as shown in FIG. 1A. When a magnetic recording domain 3 is formed in the recording layer, its magnetization will then be antiparallel to the magnetization of the initialization layer and the initialization magnetic field. Therefore, the initialization magnetic field will be applied in a direction to collapse the magnetic domain, and the action of the interface magnetic wall to expand the magnetic domain and the magnetic field cancel each other, whereby recording stability is further improved.

Figure 10:
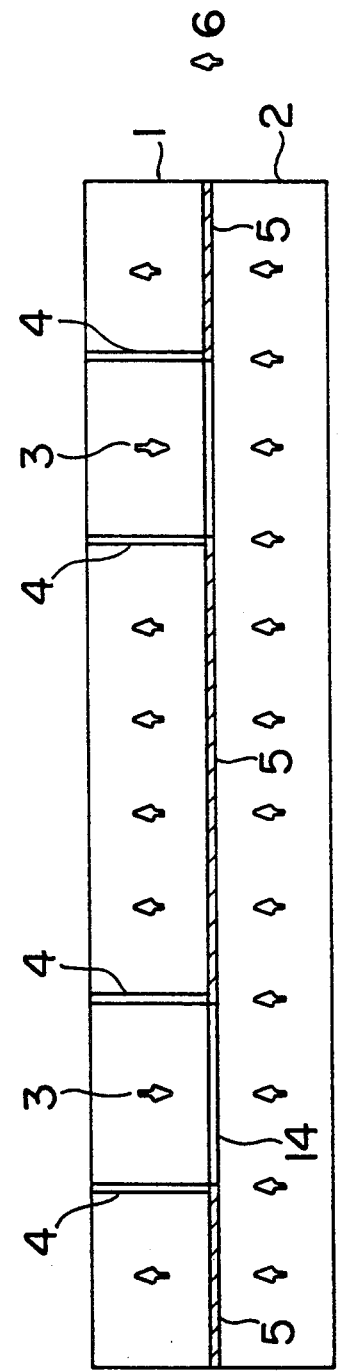
FIG. 10 is a schematic view showing the optical magnetic medium of the present invention having an interplanar magnetized film between the recording layer and the initialization layer.

In order for the action of the Bloch magnetic wall and the interface magnetic wall to cancel each other completely, the film thickness of the recording layer may be made thick, but this is not practical because recording sensitivity is worsened. Instead, it is preferable to decrease the energy density of the interface magnetic wall. For that purpose, it is preferable to control the energy density using a vertically or interplanar magnetized film 14 (see FIG. 10). Preferably, the vertically magnetized film is Gd-Fe, Gd-Fe-Co, Gd-Co, Gd-Tb-Fe, Gd-Tb-Fe-Co, Gd-Tb-Co, etc. and the interplanar magnetized film is Fe, Co, Ni or Gd-Fe, Gd-Fe-Co, Gd-Co, Gd-Tb-Fe, Gd-Tb-Fe-Co, Gd-Tb-Co, etc. with large magnetization having a small magnetic wall energy sandwiched between the recording layer and the initialization layer.

EXAMPLE 1

In a sputtering device equipped with ternary targets, a disk-shaped substrate made of polycarbonate engraved with pregroove and preformat signal was set at a distance of 15 cm from the targets and rotated.

In argon, from the first target, $Si_3N_4$ was provided as the protective film to a thickness of 500 Å, under the conditions of a sputtering speed of 40 Å/min. and a sputtering pressure of $1.5 \times 10^{-1}$ Pa. Next, in argon, from the second target, a Tb-Fe alloy was sputtered under the conditions of a sputtering speed of 100 Å/min., a sputtering pressure of $1.5 \times 10^{-1}$ Pa to form a recording layer which is Fe sub-lattice magnetization dominant with a film thickness of 500 Å, T (Curie temperature)$_L$=about 130° C., and H (coecive force)$_H$=about 15 KOe.

Next, in argon, from the third target, a Gd-Tb-Fe-Co alloy was sputtered under the conditions of a sputtering speed of 100 A/min. and a sputtering pressure of $1.5 \times 10^{-1}$ Pa to form an initialization layer with preferential Gd-Tb sub-lattice magnetization with a thickness of 700 A, $T_H$=about 220° C., $H_L$=about 4 KOe, a compensation temperature of about 140° C.

Next, in argon, from the first target, $Si_3N_4$ was provided as the protective layer with a thickness of 700 Å under the conditions of a sputtering speed of 40 Å/min. and a sputtering pressure of $1.5 \times 10^{-1}$ Pa.

Next, the substrate after completion of the above film formation was plastered with a substrate for plastering of polycarbonate by use of a hot melt adhesive to prepare an optical magnetic disk. The optical magnetic disk was set in a device for recording and reproduction, and while applying a bias magnetic field of 200 Oe and an initialization magnetic field of 2 KOe, by use of a laser beam with a wavelength of 830 nm converged to about 1.5 μm at a line speed of about 8 mm/sec. under modulation at 50% duty and 2 MHz, recording was performed by laser power at two values of 3.8 mW and 6.4 mW. Then, reproduction was performed by irradiation of a laser beam of 1 mW, and the signal of the two values could be reproduced.

Next, after the above experiment was conducted, recording was performed on the same track at 3 MHz with the same power. As the result, no signal component previously recorded was detected, whereby it was confirmed that overwriting was possible.

After recording of the present invention was performed on the disk by modulating the laser intensity as "low" or "high" corresponding to the recording signals "1" or "0", respectively, the disk was stored in an environment of a temperature of 70° C. and an initialization magnetic field of 2 KOe during 100 hours, and there was no change in recorded information.

COMPARATIVE EXAMPLE 1

On the disk of Example 1, in place of recording of the present invention, recording was performed on the disk by modulating the laser intensity as "high" or "low" corresponding to the recording signals "1" or "0", respectively, the disk was stored in an environment of a temperature of 70° C. and an initialization magnetic field of 2 KOe during 100 hours, and the recorded information was found to be changed.

EXAMPLE 2

An optical magnetic disk was prepared in the same manner as described in Example 1 except that as the initialization layer, from the third target, a Gd-Tb-Fe-Co alloy was sputtered under the conditions of a sputtering speed of 100 Å/min. and a sputtering pressure of $1.5 \times 10^{-1}$ Pa, to form an initialization layer which is Fe-Co sub-lattice magnetization dominant with a film thickness of 700 Å, $T_H$=about 220° C., $H_L$=about 5 KOe.

As the result, overwriting was confirmed to be possible.

After recording of the present invention was performed on the disk by modulating the laser intensity as "low" or "high" corresponding to the recording signal "1" or "0", respectively, the disk was stored in an environment of 50° C. and an initialization magnetic field of 2 KOe during 100 hours, and there was no change in recorded information.

COMPARATIVE EXAMPLE 2

On the disk of Example 2, in place of recording of the present invention, recording was performed on the disk by modulating the laser intensity as "high" or "low" corresponding to the recording signal "1" or "0", respectively, the disk was stored in an environment of a temperature of 50° C. and an initialization magnetic field of 2 KOe during 100 hours, and the recorded information was found to be changed.

The states of magnetization after recording in Examples 1, 2 and Comparative examples 1, 2 are shown successively in FIGS. 6 to 9.

The present invention is applicable to various applications in addition to that shown in Examples. The present invention therefore includes all such applications without departing from the scope of the appended claims.

What is claimed is:

1. A method of magneto-optical recording information comprising the steps of:

using an optical-magnetic recording medium including a first magnetic layer and a second magnetic layer having a higher Curie point and lower coercive force at room temperature than that of said first magnetic layer;

initializing said medium to align the magnetization direction of said second magnetic layer in one direction;

irradiating said medium with an optical beam that is modulated with information to be recorded on the medium between two non-zero values, to thereby record the information in the form of magnetic domains onto the medium; and re-initializing after said recording of said information, wherein the medium is formed in such a way that during said re-initializing: (i) no interface magnetic wall exists between said first and second magnetic layers inside each of said magnetic domains which is surrounded by Bloch magnetic walls, and (ii) an interface magnetic wall exists between said first and second magnetic layers at portions other than said recorded magnetic domains.

2. A method of magneto-optical recording information comprising the steps of:

using an optical magnetic recording medium comprising a first magnetic layer and a second magnetic layer, said second magnetic layer having a higher Curie point and a lower coercive force at room temperature than said first magnetic layer;

initializing said medium to align the magnetization direction of said second magnetic layer in one direction; and irradiating said medium with an optical beam that is modulated with information to be recorded on the medium between two non-zero values, to thereby record the information in the form of magnetic domains onto the medium, whereby when the recording medium is reinitialized after said recording of information, the medium is formed in such a way that during said reinitializing: (i) no interface magnetic wall will exist between said first and second magnetic layers inside each of said magnetic domains which is surrounded by Bloch magnetic walls, and (ii) an interface magnetic wall will exist between said first and second magnetic layers at portions other than said recorded magnetic domains.

3. An information recording method according to claims 1 or 2, wherein said first and second magnetic layers satisfy $$H_H > H_L > \frac{\sigma \omega}{2Msh}$$

wherein $H_H$ is a high coercive force of the first magnetic layer, $H_L$ is a low coercive force of the second magnetic layer, Ms is a saturated magnetization of the second magnetic layer, h is a thickness of the second magnetic layer, and $\sigma\omega$ is a magnetic wall energy between the first and second magnetic layers.

4. A method according to claims 1 or 2, wherein a third magnetic layer is provided for controlling the energy of the interface magnetic wall between said first and second magnetic layers, said third magnetic layer being arranged between said first and second magnetic layers.

5. An information recording method according to claim 4, wherein said magnetization film is a vertical magnetization film.

6. An information recording method according to claim 4, wherein said magnetization film is an interplanar magnetization film.

7. A method according to claims 1 or 2, wherein said first and second magnetic layers comprise a rare earth-transition metal amorphous alloy thin film.

8. An information recording method according to claim 7, wherein a magnetization film with small magnetic wall energy is provided for controlling the energy of the interface magnetic wall between said first and second magnetic layers.

9. An information recording method according to claim 8, wherein said magnetization film is a vertical magnetization film.

10. An information recording method according to claim 8, wherein said magnetization film is an interplanar magnetization film.

* * * * *

UNITED STATES PATENT AND TRADEMARK OFFICE
CERTIFICATE OF CORRECTION

PATENT NO. : 5,210,724

DATED : May 11, 1993

INVENTOR(S) : TADASHI KOBAYASHI

It is certified that error appears in the above-indentified patent and that said Letters Patent is hereby corrected as shown below:

On the title page, item [54] and column 1, line 4, "BLOCK" should read --BLOCH--.

COLUMN 1

Line 4, "BLOCK" should read --BLOCH--.
    Line 18, "lower" should read --a lower--.
    Line 24, "is" should read --is the--.

COLUMN 2

Line 6, "faces" should read --face--.
    Line 52, "to be used" should be deleted.
    Line 53, "in" should read --of--.

COLUMN 3

Line 19, "of of" should read --of--.
    Line 46, "In" should be deleted.

COLUMN 4

Line 4, close up right margin.
    Line 5, close up left margin.
    Line 34, close up right margin.
    Line 35, close up left margin.

UNITED STATES PATENT AND TRADEMARK OFFICE
CERTIFICATE OF CORRECTION

PATENT NO. : 5,210,724
DATED : May 11, 1993
INVENTOR(S) : TADASHI KOBAYASHI

It is certified that error appears in the above-indentified patent and that said Letters Patent is hereby corrected as shown below:

COLUMN 6

Line 57, "(coecive" should read --(coercive--.
    Line 61, "100 A/min." should read --100 Å/min.--.
    Line 65, "700 A," should read --700 Å,--.

COLUMN 8

Line 10, "recording" should read --recording of--.
    Line 34, "recording" should read --recording of--.

COLUMN 9

Line 11, "magnetization film" should read --third magnetic layer--.
    Line 14, "magnetization film" should read --third magnetic layer--.

Signed and Sealed this

Thirty-first Day of May, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,210,724
DATED : May 11, 1993
INVENTOR(S) : Tadashi Kobayashi

It is certified that error appears in the above-indentified patent and that said Letters Patent is hereby corrected as shown below:

COLUMN 9

Line 11, "magnetization film" should read --third magnetic layer--.
    Line 14, "magnetization film" should read --third magnetic layer--.

Signed and Sealed this

Sixth Day of September, 1994

Attest:

BRUCE LEHMAN

*Attesting Officer*      *Commissioner of Patents and Trademarks*